May 26, 1959    F. R. PRESCOTT    2,887,737

SEALING MEANS FOR GLAZING UNIT

Filed July 12, 1954

INVENTOR
FRANK R. PRESCOTT

Oscar H Spencer
ATTORNEY

United States Patent Office 2,887,737
Patented May 26, 1959

2,887,737
SEALING MEANS FOR GLAZING UNIT

Frank R. Prescott, New Kensington, Pa., assignor to Pittsburgh Plate Glass Company, Allegheny County, Pa., a corporation of Pennsylvania Application July 12, 1954, Serial No. 442,608

5 Claims. (Cl. 20—56.5)

This invention relates to an improvement in multiple glazed units that comprise at least two spaced sheets of glass that are united around their peripheries by a peripheral strip. In particular, this invention relates to improved pore opening seals to be used in conjunction with such assemblies.

Conventionally, units of the type described above are fabricated by holding two sheets of glass slightly apart and heating the peripheral portion of the glass sheets until they fuse. This fusing is usually accomplished by passing an electric current through a thin film of graphite placed around the periphery of the glass in order to impart sufficient heat to the glass to heat it to fusing temperature. The graphite strip is vaporized at the high temperature produced and the glass periphery itself becomes electrically conductive while the glass is being fused. Before the glass is allowed to cool, the two sheets are further separated by means such as suction. A typical method of forming such as assembly, known commonly as an all-glass unit, is described in U.S. Patent Number 2,624,978, issued to Frederick R. Hohmann.

It is necessary that the assembly be allowed to breathe during fabrication, and for this purpose, a small opening, known as a pore hole, is drilled adjacent the corner of one of the glass sheets comprising the assembly. This provision for breathing is made in order to prevent failure of the unit due to a large pressure differential that would otherwise be established between the outside atmosphere and the air contained within the assembly when the individual glass sheets are separated.

The most difficult problem to overcome in the utilization of all glass units has been the provision of a suitable seal to close the pore hole required during fabrication of the assembly.

In order for a seal closing the pore hole to be acceptable, it must inhibit the passage of dust and dirt into the space enclosed by the glass sheets and provide a closing that is both water and air tight. The necessity for a water impervious seal is obvious. The presence of water vapor within the window assembly causes fogging of the inner surface of the sheet exposed to a temperature below the dew point of the air within the assembly. This reduces the transparency of the assembly. Therefore, it is necessary before the pore hole is sealed that dry air be inserted within the air chamber enclosed by the assembly.

Since glass is able to withstand considerable compressive forces but fractures easily upon the application of tensile stresses, it has been found advisable to force dry air within the assembly under pressure before the pore hole is sealed, thus applying a compressive force to the outer surface of the assembly in the vicinity of the periphery. When the assembly is subjected to temperature and pressure variations during use, the tendency of the outer surface of the assembly to be placed in tension is compensated for by the prestressing of the unit due to the introduction of the dry air under pressure at the time the pore hole is sealed. For most operations a pressure slightly above one atmosphere has been found to be most suitable for providing sufficient stress compensation for the range of temperature and pressure variations to which these units can be expected to be subjected. Thus, a suitable pore hole seal is required to be strong enough to maintain the dry air within the assembly under pressure.

Accordingly, it is an object of the present invention to provide improved sealing means for the pore hole of an assembly of the type described hereinabove.

Another object is to provide an improved unitary window unit of substantially homogenous structure enclosing an air space.

These and other objects of the present invention have been attained by providing a novel seal for the pore hole. This invention is characterized by a seal located in a recessed position with respect to the outer surface of the sheet of glass containing the pore opening. This recessing has been accomplished both by providing a specially designed recessed aperture for maintaining the seal in a desired location and also by designing a seal capable of being maintained in a recessed position within a pore hole.

Figure 1:
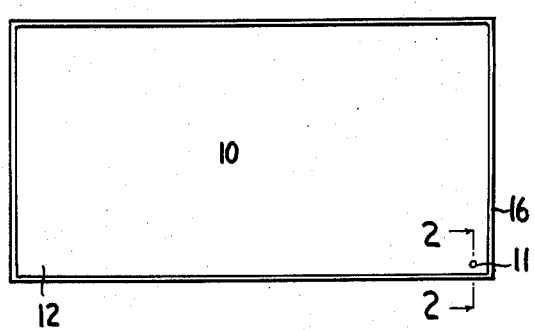
Figure 1 represents a plan view of a multiple pane glass unit provided with a pore hole, the seal for which is the subject matter of the present invention.
Figure 2:
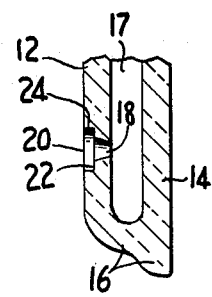
Figure 2 is a cross-sectional view of a portion of the unit depicted in Figure 1 and taken along lines 2—2 of Figure 1.

A typical multiple glazed unit is depicted by reference numeral 10 in Figure 1. This assembly 10 is provided with a pore hole 11 which is required to be sealed and which will be described in greater detail below. Glass panes 12 and 14 (Figure 2) connected around their periphery by a peripheral glass portion 16 enclose a space 17 within the assembly. The pore hole 11 is shown in Figure 2 as a substantially completely tapered aperture 18. Adjacent the outer surface of pane 12 is an offset portion 20. The offset portion is provided with an inner circular shoulder 22 substantially parallel to the outer surface of the glass and a peripheral circular portion 24 substantially perpendicular to the outer surface of the glass.

Figure 3:
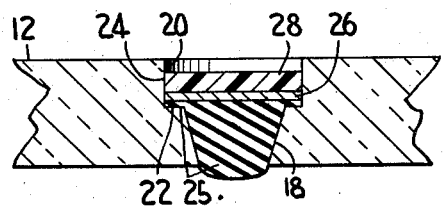
Figures 3 to 6 are enlarged cross-sectional views of various embodiments of the present invention taken along the lines 3—3 of Figure 2.

As shown in Figure 3, a mastic 25 is used to fill the tapered portion 18 of the opening 11 and initially is closer to the surface than shoulder 22. The mastic can be a thermoplastic material such as a polyisobutylene composition disclosed in U.S. Patent Number 2,551,952, granted to Gerald E. Kunkle.

A disc-like member 26 conforming to the shape of the offset portion 20 rests on the shoulder 22 of the offset portion. This disc may be made of copper, aluminum, lead, glass or preferably a metal or glass having substantially the same coefficient of expansion as glass 12. A specific example is an alloy sold commercially as 4750 metal. This metal is an alloy which contains 47 percent nickel, 50 percent iron and 3 percent tramp metals in varying quantities. These tramp metals include aluminum, silicon, and various other additives which are included to vary the coefficient of expansion of the disc to make it substantially the same as that of the specific glass composition used in the window structure.

The disc 26 is adhered to the mastic 25 by heat and pressure, thereby causing some of the mastic to flow between the disc 26 and the shoulder 22 and periphery 24 of the offset portion of the pore hole. A suitable covering 28 is applied on the outer surface of the disc and then flowed around the latter for example by means of heat and pressure where needed to seal off the rest of the assembly. This latter cap is preferably a resinous product sold commercially as a Spar varnish (a mixture of tung oil and ester gums or rosin in a suitable thinner, such as 41 percent oil, 16 percent resins and 43 percent mineral spirits, respectively).

Other suitable sealing caps include other varnishes, Aquarium cement (3 parts red lead, 7 parts litharge, 1 part powdered resin, 10 parts fine sand and sufficient Spar varnish to make a stiff cement), Portland cement with a stearate waterproofing compound, De Khotinsky cement (a mixture comprising about 70 parts by weight of shellac and 30 parts by weight of pine tar), a mixture of lead oxide and glycerine, sealing wax, rosin, magnesium oxychloride cement, plaster with an acrylic-water emulsion, silver chloride, polyethylene, a vinyl copolymer of acrylonitrile-butadiene, a mixture of 5 parts hide glue and 1 part dissolved acid chromate of lime, sodium silicate, a mixture of 2 parts cement, 2 parts litharge and 1 part of glycerine by volume and epoxide type adhesives which are copolymers of epichlorohydrin and bis phenol A. This list is provided to show various typical substances which may be used. In order to insure that the sealing cap does not protrude over the outer glass surface, the cap may be provided with a concavely shaped outer surface.

A glass or metal disc may also be adhered in the recessed pore opening by means of a low melting glass frit or a low melting metal alloy of tin, lead, antimony, bismuth, indium, etc. such as the following:

| | Parts by weight |
|---|---|
| (1) Bismuth | 50 |
| Tin | 13.3 |
| Lead | 26.7 |
| Cadmium | 10.0 |
| (2) Tin | 50 |
| Indium | 50 |
| (3) Lead | 62 |
| Cadmium | 8 |
| Antimony | 30 |

Figure 4:
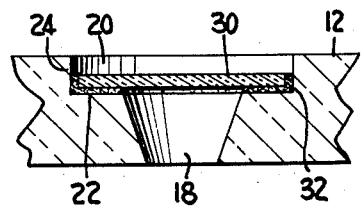

The glass frits and low melting alloys should have a fusing temperature above 150° F. and preferably below 600° F. but it may be higher. An illustration of such embodiment of the invention making use of a counterbored pore opening is shown in Figure 4. In this figure a glass disc 30 is shown adhered in the offset portion 20 by means of a low melting glass frit 32. The disc 30 is preferably of the same composition as glass 12 so that the coefficient of thermal expansion will be the same.

Figure 5:
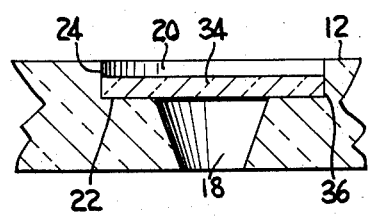

It is also contemplated that the glass disc 30 be welded directly to the offset portion by heating the two to soften them and pressing them together to form the weld. In such case the glass disc may be of the same composition as the glass 12 or different, but in all events, it is preferable that the disc have substantially the same coefficient of thermal expansion as the glass 12. Such further embodiment is shown in Figure 5 wherein a glass disc 34 is welded directly to offset portion 20 by means of heat and pressure. The fusion of the glass element 34 to the offset portion 20 may be accomplished by induction heating or by dielectric heating.

The recessed pore hole 11 should be made prior to assembling the all-glass unit. It is possible to prepare the recessed pore hole by first cutting a tapered hole and then enlarging the upper portion of the hole by means of a dimet drill to form the shoulder 22 a desired distance below the surface. Another method of forming this recessed opening is by drilling with a specially shaped diamond dust impregnated metal drill. It is important that the narrowest portion of the opening 11 have a diameter not substantially less than .1 inch in order to allow free flow of air between the air space 17 and the atmosphere during fabrication of the unit.

The provision of an opening 11 wider at its outer end than at its inner end enables one to insert a disc-like element with ease. The line where the disc is supported within the opening is termed the shoulder. This shoulder is preferably formed parallel to the outer surface of the sheet in order to properly orient the disc as well as recessing the latter within the opening.

A typical disc for use with a pore hole provided in a sheet ⅛ inch thick with a countersunk portion having a diameter of ¼ inch and 0.04 inch deep is between 0.005 and 0.01 inch thick and 0.24 inch in diameter. Of course, these dimensions may be varied without departing from the scope of the invention. For a pore hole having a counterbore 0.250 inch in diameter and 0.08 inch in depth, for example, a disc diameter of 0.24 inch and thickness of 0.005 inch to .015 inch has been found suitable.

It is preferable that the disc-like element have a coefficient of expansion that is compatible with glass. Hence, the use of 4750 metal is desirable. However, under certain conditions 4750 metal oxidizes and forms a corrosive coating. This difficulty may be overcome in a variety of ways, for example, by cladding the 4750 with a thin film of a metal difficult to oxidize, such as gold, silver or platinum, for example, in order to provide a non-oxidizable surface to which the resinous caps may be applied without too much difficulty.

By the provision of an offset portion to the pore hole, it has become possible to adhere various types of vapor impermeable seals to the shoulder of the offset portion thereby enabling the entire glass assembly to be free of any protrusion on its outer surface no matter what type of sealing element is provided, as long as the thickness of the element does not exceed the thickness of the offset portion. Thus, assemblies of the type described may be shipped without fear of loosening of the pore hole seal in transit and special instructions need not be provided to glaziers to avoid their damaging the seal by scraping with their glazing tools during mounting.

Figure 6:
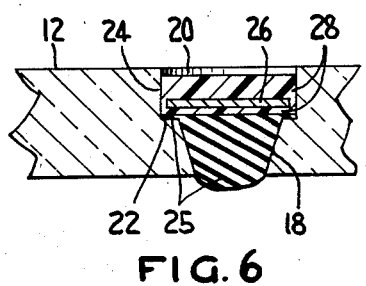

Still another embodiment of a seal made according to the teachings of the present invention is shown in Figure 6. This embodiment differs from that disclosed in Figure 3 only in that the resin 28 covers both surfaces of the metal disc 26. It has been found that under conditions of excessive humidity, water vapor, which tends to destroy the adhesion between the resin and the peripheral walls 24 of the glass, also tends to separate the metal 26 from the mastic. However, the interface between the resin 28 and the mastic 25 is relatively unaffected. Also, the resin itself is relatively impervious to water vapor. Hence, by completely encasing the metal 26 in the resin covering 28, the sealing assembly is substantially unaffected by high humidities. The undercoat of the covering 28 is preferably thin compared to the outer covering so that the metal 26 is located adjacent the externally disposed surface of the mastic 25 separated therefrom by the thin undercoating. By the same token, the glass disc 30 shown in Figure 4 may be completely covered with a low melting alloy or glass frit adhesive as described above.

The novel structure disclosed herein has made possible the most efficient use of polyisobutylene modified by the addition of from 30 percent to 50 percent by weight of carbon black in accordance with the teachings of the Kunkle patent to seal the pore hole of all glass units. The present structure not only provides the most efficient air and water impervious organic sealing compound known at present, but also provides a most practical means for maintaining the plug within the pore hole.

It is understood that the scope of the present invention is not limited to the specific embodiment and materials described above, but also extends to any modifications that become apparent upon reading this description and which are included within the scope of the accompanying claims.

I claim:
1. In a window closure assembly comprising two spaced panes of glass enclosing a chamber, comprising in combination, an aperture provided in one of said glass sheets, the inner section of the aperture being tapered, the smallest diameter of the taper being located adjacent said chamber, and an enlarged recessed portion extending inwardly from the outer surface of said glass sheet, a circular shoulder substantially parallel to the outer surface of said glass sheet at the innermost end of said enlarged recessed portion, said shoulder defining a torus extending from the periphery of said recessed portion to the periphery of said tapered portion at the plane of largest diameter of said tapered portion and a sealing member disposed upon said shoulder and adhered thereto to provide a closure for the aperture.

2. The structure recited in claim 1 wherein the sealing member comprises a metallic member united to the shoulder of said recessed portion.

3. The structure recited in claim 1 wherein the sealing member comprises a glass member united to the shoulder of the recessed portion.

4. In the structure described in claim 1, a mastic material provided in said tapered portion, a metallic disc-like, water and air impervious sealing member united with the shoulder of said recessed portion and in contact with said mastic material, and a water and air impervious synthetic resin covering for said metallic disc-like member.

5. The structure described in claim 1 wherein mastic material is provided in said tapered portion, a metallic disc-like, water and air impervious sealing member is united with the shoulder of said recessed portion and in contact with said mastic material, and a water and air impervious synthetic resin covering of concave contour is provided for said metallic disc-like member.

References Cited in the file of this patent
UNITED STATES PATENTS

| | | |
|---|---|---|
| 2,621,397 | Black | Dec. 16, 1952 |
| 2,686,342 | D'Eustachio | Aug. 17, 1954 |
| 2,688,824 | Badger et al. | Sept. 14, 1954 |
| 2,749,579 | Shaw | June 12, 1956 |
| 2,784,462 | Fix | Mar. 12, 1957 |